United States Patent
Kure

(10) Patent No.: US 9,407,387 B2
(45) Date of Patent: Aug. 2, 2016

(54) APPARATUS AND METHOD FOR SYNCHRONIZED TRANSMISSION OF MULTIMEDIA CONTENT OVER AN ASYNCHRONOUS NETWORK

(71) Applicant: SONY CORPORATION, Minato-ku (JP)

(72) Inventor: Yoshinobu Kure, Kanagawa (JP)

(73) Assignee: SONY CORPORATION, Minato-ku (JP)

( * ) Notice: Subject to any disclaimer, the term of this patent is extended or adjusted under 35 U.S.C. 154(b) by 107 days.

(21) Appl. No.: 14/358,386

(22) PCT Filed: Dec. 11, 2012

(86) PCT No.: PCT/JP2012/007892
§ 371 (c)(1),
(2) Date: May 15, 2014

(87) PCT Pub. No.: WO2013/099122
PCT Pub. Date: Jul. 4, 2013

(65) Prior Publication Data
US 2014/0348184 A1    Nov. 27, 2014

(30) Foreign Application Priority Data

Dec. 26, 2011  (JP) .................................. 2011-283844

(51) Int. Cl.
*H04L 7/04*     (2006.01)
*H04J 3/06*     (2006.01)
*H04N 21/242*   (2011.01)
*H04N 21/8547*  (2011.01)
*H04N 21/236*   (2011.01)
(Continued)

(52) U.S. Cl.
CPC ............. *H04J 3/0635* (2013.01); *H04L 7/0037* (2013.01); *H04L 65/4084* (2013.01); *H04N 21/23608* (2013.01); *H04N 21/242* (2013.01); *H04N 21/8547* (2013.01); *H04J 3/0667* (2013.01)

(58) Field of Classification Search
None
See application file for complete search history.

(56) References Cited

U.S. PATENT DOCUMENTS

2001/0012300 A1*  8/2001  Raisanen ...................... 370/429
2006/0056460 A1*  3/2006  Currivan ...................... 370/503
(Continued)

FOREIGN PATENT DOCUMENTS

CN       102082697 A    6/2011
EP       2 343 845 A2    7/2011
(Continued)

OTHER PUBLICATIONS

International Search Report issued Feb. 19, 2013 in PCT/JP2012/007892.
(Continued)

*Primary Examiner* — Chi H Pham
*Assistant Examiner* — Shick Hom
(74) *Attorney, Agent, or Firm* — Chip Law Group

(57) ABSTRACT

An apparatus includes a receiver, a delay value receiver, a time stamp calculation unit, and a transmitter. The receiver is configured to receive a content signal. The delay value receiver is configured to receive a delay value from another apparatus. The time stamp calculation unit is configured to determine a time stamp based on the delay value. The transmitter is configured to send the content signal including the time stamp to the other apparatus.

18 Claims, 7 Drawing Sheets

(51) Int. Cl.
*H04L 29/06* (2006.01)
*H04L 7/00* (2006.01)

(56) References Cited

U.S. PATENT DOCUMENTS

| | | | |
|---|---|---|---|
| 2006/0070111 A1* | 3/2006 | Kurosawa | 725/105 |
| 2006/0261282 A1 | 11/2006 | Nakajima | |
| 2007/0286320 A1 | 12/2007 | Jiang | |
| 2010/0085989 A1 | 4/2010 | Belhadj et al. | |
| 2010/0220748 A1 | 9/2010 | Inomata | |
| 2011/0051754 A1* | 3/2011 | Lansdowne | 370/503 |
| 2011/0164178 A1 | 7/2011 | Hardy et al. | |
| 2012/0086814 A1* | 4/2012 | Tsubaki et al. | 348/192 |
| 2012/0170631 A1 | 7/2012 | Liu | |
| 2012/0320794 A1 | 12/2012 | Belhadj et al. | |
| 2013/0004160 A1 | 1/2013 | Chen et al. | |

FOREIGN PATENT DOCUMENTS

| | | |
|---|---|---|
| EP | 2 458 787 A1 | 5/2012 |
| JP | 2010-190635 A | 9/2010 |
| WO | WO 2011/120185 A1 | 10/2011 |

OTHER PUBLICATIONS

Hans Weibel, "IEEE 1588, Standard for a Precision Clock Synchronization Protocol" Conference on IEEE 1588, XP002588537, Oct. 2, 2006, 56 pages.

* cited by examiner

APPARATUS AND METHOD FOR SYNCHRONIZED TRANSMISSION OF MULTIMEDIA CONTENT OVER AN ASYNCHRONOUS NETWORK

TECHNICAL FIELD

The present disclosure relates to a transmission apparatus, a transmission method, a reception apparatus, a reception method, a synchronous transport system, a synchronous transport method, and a program encoded on a non-transitory computer readable medium, and particularly relates to a transmission apparatus, a transmission method, a reception apparatus, a reception method, a synchronous transport system, a synchronous transport method, and a program encoded on a non-transitory computer readable medium preferably used in a case where multimedia data is synchronously transported via an asynchronous packet transport network.

BACKGROUND ART

Up to now, a video camera and a camera control unit (hereinafter, which will be referred to as CCU) which are used in a broadcasting station or the like are connected by an HD-SDI cable, and a video signal is synchronously transported via this HD-SDI cable in an uncompressed manner. Then, in recent years, this HD-SDI cable is being replaced with an Ethernet (registered trademark) cable. In this case, similarly as in a time when the HD-SDI cable is used, it is requested that respective reference signals of the video camera and the CCU are synchronized with each other at a high precision and a transport delay of the video signal is set to be smaller than or equal to a video frame interval.

The synchronization at the high precision between the respective reference signals of the video camera and the CCU connected by the Ethernet (registered trademark) cable can be realized by using IEEE1588 PTP (Precision Time Protocol) (for example, see PTL 1).

Also, with regard to the setting on the transport delay to be smaller than or equal to the video frame interval, no problem occurs upon the replacement with the Ethernet (registered trademark) cable so long as a distance is short to an extent that the connection can be established by the HD-SDI cable.

CITATION LIST

Patent Literature

PTL 1: Japanese Unexamined Patent Application Publication No. 2010-190635

SUMMARY OF INVENTION

Technical Problem

Furthermore, in these days, demands are increased in which the video camera and the CCU are each connected to an asynchronous packet transport network represented by the internet (including WAN (wide area network) and LAN (local area network)) and the video signal is transported via this asynchronous packet transport network.

In this case too, the synchronization at the high precision between the respective reference signals of the video camera and the CCU can be realized by using IEEE1588 PTP. However, it is difficult to guarantee the setting on the transport delay of the video signal to be smaller than or equal to the video frame interval.

If the transport delay of the video signal is increased, when video data in a media phase (a frame phase in the case of the video signal) matched to the reference signal of itself is transmitted by a transmission side and it is received by a reception side, a shift is generated between the relevant media phase and the reference signal on the reception side. As a result, an interference occurs in video and audio when the video signal received by the reception side is processed.

It should be noted that the media phase refers to an offset amount of a frame re-production timing (FSYNC or the like in the case of the video signal) of the multimedia data with respect to a predetermined reference signal.

The present disclosure has been made in view of the above-mentioned circumstances and aims to enable the multimedia data such as the video signal to be synchronously transported via the asynchronous packet transport network.

Solution to Problem

In one embodiment, the invention includes an apparatus including a receiver, a delay value receiver, a time stamp calculation unit, and a transmitter. The receiver is configured to receive a content signal. The delay value receiver is configured to receive a delay value from another apparatus. The time stamp calculation unit is configured to determine a time stamp based on the delay value. The transmitter is configured to send the content signal including the time stamp to the another apparatus.

In another embodiment, the apparatus includes a receiver, a delay value calculator, and a transmitter. The receiver is configured to receive a content signal including a time stamp from another apparatus. The delay value calculator is configured to calculate a delay value based on the time stamp and a reception time of the time stamp. The transmitter is configured to send the delay value to the another apparatus so that the another apparatus uses the delay value to calculate a later time stamp.

According to the second aspect of the present disclosure, it is possible to receive the multimedia data such as the video signal via the asynchronous packet transport network without the phase shift.

According to the third aspect of the present disclosure, it is possible to synchronously transport the multimedia data such as the video signal via the asynchronous packet transport network.

DESCRIPTION OF EMBODIMENTS

Hereinafter, best modes for implementing the present disclosure (hereinafter, which will be referred to as embodiments) will be described in detail with reference to the drawings.

<1. Embodiments>
<Configuration Example of a Synchronous Transport System>

Figure 1:
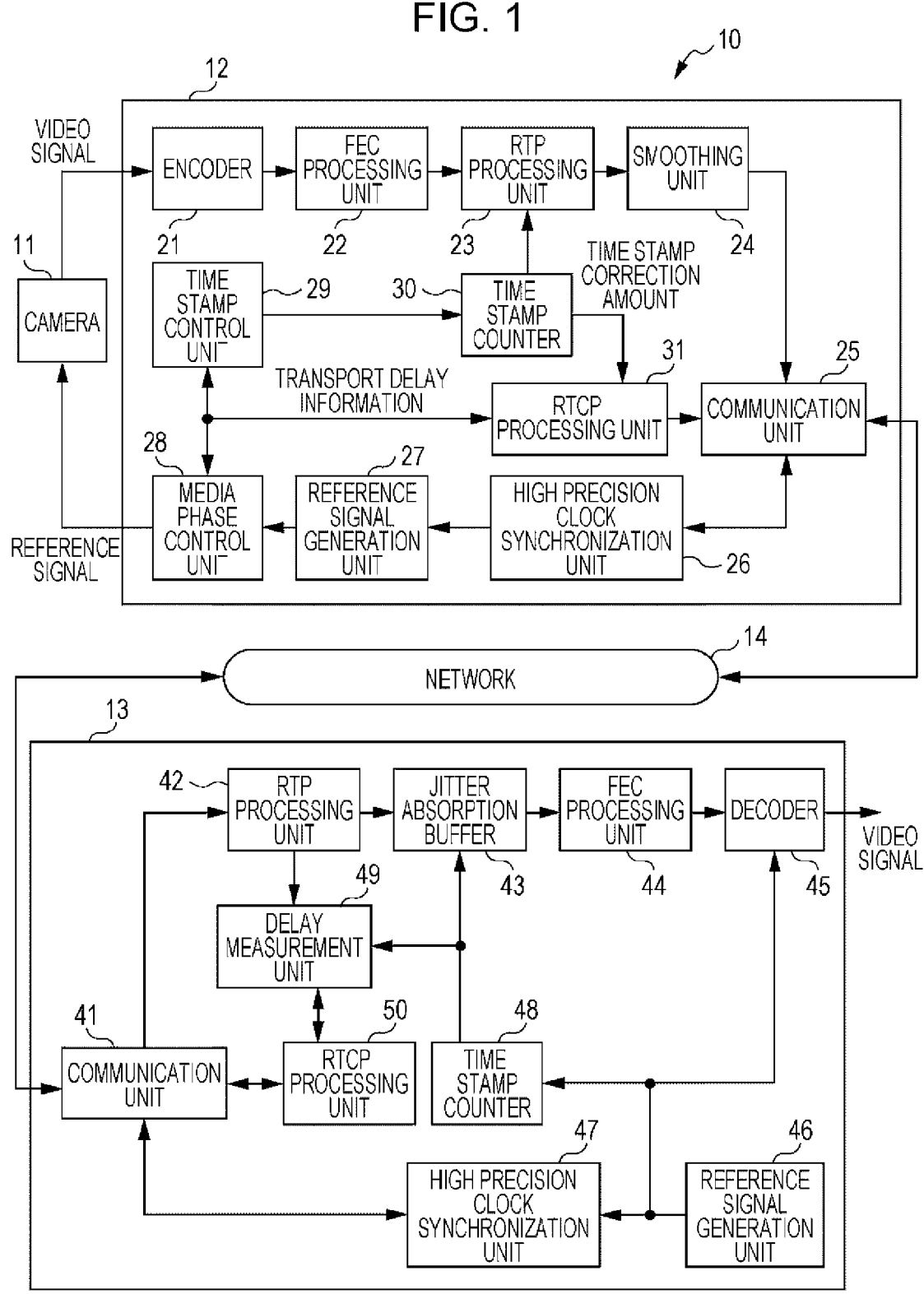
FIG. 1 is a block diagram illustrating a configuration example of a synchronous transport system to which the present disclosure is applied.

FIG. 1 illustrates a configuration example of a synchronous transport system according to the present embodiment. This synchronous transport system 10 is composed of a camera 11, a transmission apparatus 12, and a reception apparatus 13.

The camera 11 performs video shooting in synchronization with a reference signal in conformity to SMPTE-274M which is supplied from a media phase control unit 28 of the transmission apparatus 12 and outputs a video signal obtained as the result via an HD-SDI I/F to the transmission apparatus 12.

While the reference signal and a system clock are synchronized with the reception apparatus 13 connected via a network 14, the transmission apparatus 12 packetizes the video signal input from the camera 11 through a compression coding to be synchronously transported to the reception apparatus 13 via the network 14. The reception apparatus 13 receives and decodes the video signal transmitted in the state of the compression coding and packetization from the transmission apparatus 12. The network 14 is an asynchronous packet transport network represented by the internet.

<Configuration Example of the Transmission Apparatus 12>

The transmission apparatus 12 is composed of an encoder 21, an FEC processing unit 22, an RTP processing unit 23, a smoothing unit 24, a communication unit 25, a high precision clock synchronization unit 26, a reference signal generation unit 27, the media phase control unit 28, a time stamp control unit 29, a time stamp counter 30, and an RTCP processing unit 31.

The encoder 21 performs the compression coding on the video signal input from the camera 11 and outputs the coding data obtained as the result to the FEC processing unit 22. The FEC (forward error correction) processing unit 22 performs a redundant coding processing on the input coding data to be added with an error correction code such as Reed-Solomon code and output to the RTP processing unit 23.

The RTP (real-time transport protocol) processing unit 23 packetizes the coding data added with the error correction code into RTP packets in conformity to IETF RFC3550 RTP. Also, the RTP processing unit 23 adds a time stamp S_TS where a time stamp correction amount TS_OFFSET is added which is notified from the time stamp counter 48 at a timing of carrying out the packetization, to the respective RTP packets to be output to the smoothing unit 24. It should be noted that in addition to the timing of carrying out packetization, the time stamp S_TS added to the RTP packets may correspond to a timing when the video signal is input to the encoder 21 and also may correspond to a timing when the video signal is transmitted from the transmission apparatus 12.

The smoothing unit 24 smoothes the RTP packets sequentially input from the RTP processing unit 23 to be output to the communication unit 25.

The communication unit 25 transmits the smoothed RTP packets via the network 14 to the reception apparatus 13. Also, the communication unit 25 transmits and receives, via the network 14, a PTP message for a reference signal synchronization based on IEEE1588PTP communicated between the high precision clock synchronization unit 26 and a high precision clock synchronization unit 47 of the reception apparatus 13. Furthermore, the communication unit 25 transmits and receives, via the network 14, RTCP packets communicated between the RTCP processing unit 31 and an RTCP processing unit 50 of the reception apparatus 13.

The high precision clock synchronization unit 26 controls the reference signal generation unit 27 on the basis of the PTP message communicated between the high precision clock synchronization unit 47 of the reception apparatus 13 so that the respective reference signals and system clocks of the transmission apparatus 12 and the reception apparatus 13 are synchronized with each other at a high precision. The reference signal generation unit 27 generates the reference signal synchronized with the reference signal of the reception apparatus 13 while following the control from the high precision clock synchronization unit 26 to be output to the media phase control unit 28 and other respective units.

The media phase control unit 28 decides a media phase correction amount M_OFFSET on the basis of a transport delay information D_OFFSET input from the RTCP processing unit 31 and advances a phase of the reference signal input from the reference signal generation unit 27 by the media phase correction amount M_OFFSET to be supplied to the camera 11. According to this, the camera 11 operates while following the reference signal where the phase is advanced by the media phase correction amount M_OFFSET as compared with the reference signal of the reception apparatus 13 supplied from the media phase control unit 28.

The time stamp control unit 29 decides the time stamp correction amount TS_OFFSET on the basis of the transport delay information D_OFFSET input from the RTCP processing unit 31 and notifies the time stamp counter 30 of the decided time stamp correction amount TS_OFFSET.

The time stamp counter 30 generates the time stamp S_TS corrected by adding the time stamp correction amount TS_OFFSET notified from the media phase control unit 28 to a time stamp TS representing the system clock based on the reference signal by the reference signal generation unit 27 and notifies the RTP processing unit 23 of the time stamp. Also, the time stamp counter 30 notifies the RTCP processing unit 31 of the time stamp correction amount TS_OFFSET.

The RTCP (RTP control protocol) processing unit 31 periodically generates the RTCP packet storing the time stamp correction amount TS_OFFSET notified from the time stamp counter 30 to be output to the communication unit 25. Also, the RTCP processing unit 31 generates the transport delay information D_OFFSET on the basis of an average transport delay value Da stored in the RTCP packet transmitted from the RTCP processing unit 50 of the reception apparatus 13 to be output to the media phase control unit 28 and the time stamp control unit 29.

It should be noted that since the correction on the media phase in the media phase control unit 28 is basically to cope with the transport delay of the network 14, the phase of the reference signal is advanced, but the phase can also be returned to adjust the extent of the advancement. In that case, a negative value can be generated as the media phase correction amount M_OFFSET. Similarly, the time stamp control unit 29 can not only advance but also return the time stamp TS of the time stamp counter 30. In that case, a negative value can be generated as the time stamp correction amount TS_OFFSET.

<Configuration Example of the Reception Apparatus 13>

The reception apparatus 13 is composed of a communication unit 41, an RTP processing unit 42, a jitter absorption buffer 43, an FEC processing unit 44, a decoder 45, a reference signal generation unit 46, the high precision clock synchronization unit 47, a time stamp counter 48, a delay measurement unit 49, and the RTCP processing unit 50.

The communication unit 41 receives the RTP packets storing the video signal subjected to the compression coding transmitted from the transmission apparatus 12 via the network 14 and outputs the RTP packets to the RTP processing unit 42. Also, the communication unit 41 transmits and receives the PTP message for the reference signal synchronization communicated between the high precision clock synchronization unit 47 and the high precision clock synchronization unit 26 of the transmission apparatus 12. Furthermore, the communication unit 41 transmits and receives the RTCP packets communicated between the RTCP processing unit 50 and the RTCP processing unit 31 of the transmission apparatus 12.

The RTP processing unit 42 reconstructs the RTCP packets input from the communication unit 41 to be output to the jitter absorption buffer 43. The jitter absorption buffer 43 buffers the reconstructed RTP packets and sequentially outputs the packet in which the time stamp S_TS added to the buffered RTP packet is matched with a time stamp R_TS counted in the time stamp counter 48 to the FEC processing unit 44.

In a case where an error or a deficit occurs in the coding data stored in the RTP packet output from the jitter absorption buffer 43, the FEC processing unit 44 corrects it to be output to the decoder 45. The decoder 45 decodes the coding data and outputs the video signal obtained as the result to a subsequent stage while being synchronized with the reference signal generated by the reference signal generation unit 46.

The reference signal generation unit 46 generates a reference signal functioning as a reference for operation timings of the respective units in the reception apparatus 13. It should be noted that with respect to the reference signal generated in the reference signal generation unit 46, the reference signal generated in the reference signal generation unit 27 of the transmission apparatus 12 is also synchronized. That is, with regard to the reference signals, the reception apparatus 13 side becomes a master, and the transmission apparatus 12 side becomes a slave.

The high precision clock synchronization unit 47 communicates the PTP message for the reference signal synchronization with the high precision clock synchronization unit 26 of the transmission apparatus 12. The time stamp counter 48 notifies the jitter absorption buffer 43 of the time stamp R_TS representing the system clock based on the reference signal generated by the reference signal generation unit 46.

The delay measurement unit 49 calculates a instantaneous transport delay value Dc on the basis of the time stamp S_TS added to the received RTP packet, the time stamp R_TS counted up by the time stamp counter 48, and the time stamp correction amount TS_OFFSET in the transmission apparatus 12 which is notified from the RTCP processing unit 50. Furthermore, the delay measurement unit 49 calculates the average transport delay value Da on the basis of the instantaneous transport delay value Dc to be output to the RTCP processing unit 50.

The RTCP processing unit 50 notifies the delay measurement unit 49 of the time stamp correction amount TS_OFFSET stored in the RTCP packet that is transmitted from the RTCP processing unit 31 of the transmission apparatus 12 and received by the communication unit 41. Also, the RTCP processing unit 50 stores the average transport delay value Da input from the delay measurement unit 49 in the RTCP packet for the transmission to the RTCP processing unit 31 to be output to the communication unit 25.

<Outline of Transport Timing>

Figure 2:
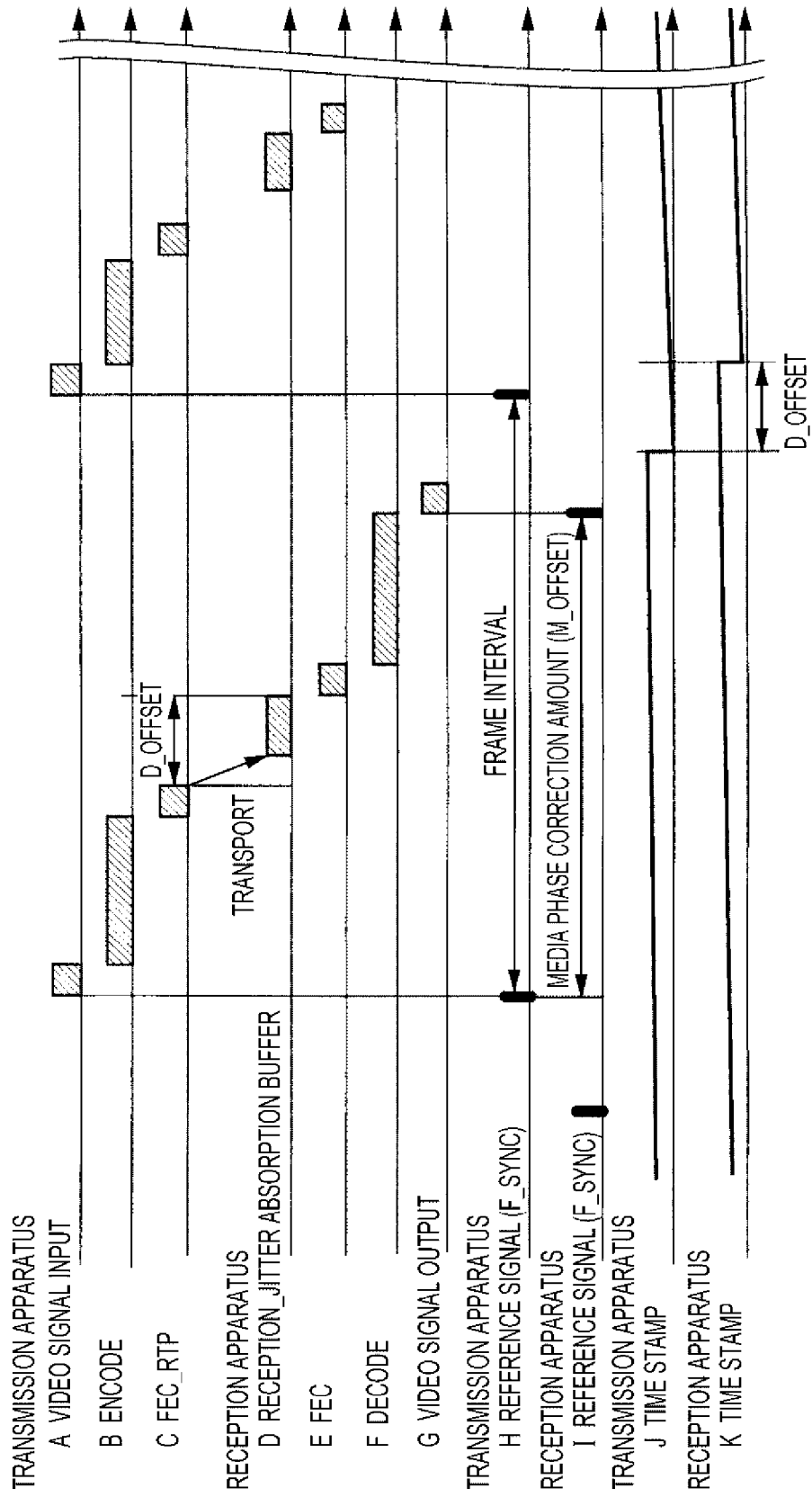
FIG. 2 is a timing chart illustrating a communication timing for a video signal.

FIG. 2 illustrates a timing at which a lead line block of one block of the video signal shot by the camera 11 is sequentially transported to the respective units in the transmission apparatus 12 and the reception apparatus 13 to be processed.

The video signal input from the camera 11 to the transmission apparatus 12 at a timing indicated by A in the same drawing is subjected to the compression coding at a timing indicated by B in the same drawing, packetized into the RTP packets at a timing indicated by C in the same drawing, added with the time stamp S_TS, smoothed, and transmitted from the transmission apparatus 12 via the network 14 to the reception apparatus 13.

The RTP packet received by the reception apparatus 13 is output from the jitter absorption buffer 43 at a timing indicated by D in the same drawing, subjected to the error correction at a timing indicated by E in the same drawing, and decoded into the video signal at a timing indicated by F in the same drawing. Then, the video signal is output from the reception apparatus 13 to a subsequent stage at a timing indicated by G in the same drawing.

The transport delay information D_OFFSET described above is a time difference between the transmission timing from the transmission apparatus 12 at the timing indicated by C in the same drawing and the output timing from the jitter absorption buffer 43 at the timing indicated by D in the same drawing.

Also, as indicated by I in the same drawing, the media phase correction amount M_OFFSET is a time difference between the input timing of the video signal with respect to the transmission apparatus 12 indicated by A in the same drawing and the output timing of the video signal from the reception apparatus 13 indicated by G in the same drawing.

As is apparent from the same drawing, the media phase correction amount M_OFFSET is a sum of various processing times in the transmission apparatus 12, the transport delay information D_OFFSET, and processing times in a stage subsequent to the jitter absorption buffer 43 in the reception apparatus 13. Herein, the various processing times in the transmission apparatus 12 and the processing times in the stage subsequent to the jitter absorption buffer 43 in the reception apparatus 13 are virtually constant and can be previously measured and set. In contrast to this, since the transport delay information D_OFFSET changes depending on a state of the network 14, the media phase correction amount M_OFFSET is changed in accordance with the change in the transport delay information D_OFFSET.

J in the same drawing illustrates a state in which the time stamp S_TS notified from the time stamp counter 30 of the transmission apparatus 12 to the RTP processing unit 23 is counted up along with an elapse of time. K in the same drawing illustrates a state in which the time stamp R_TS notified from the time stamp counter 48 of the reception apparatus 13 to the jitter absorption buffer 43 and the delay measurement unit 49 is counted up along with an elapse of time. As is apparent from J in the same drawing and K in the same drawing, the time stamp S_TS is set as a value advanced by the transport delay information D_OFFSET with respect to the time stamp R_TS.

<Operation Description of the Synchronous Transport System 10>

Figure 3:
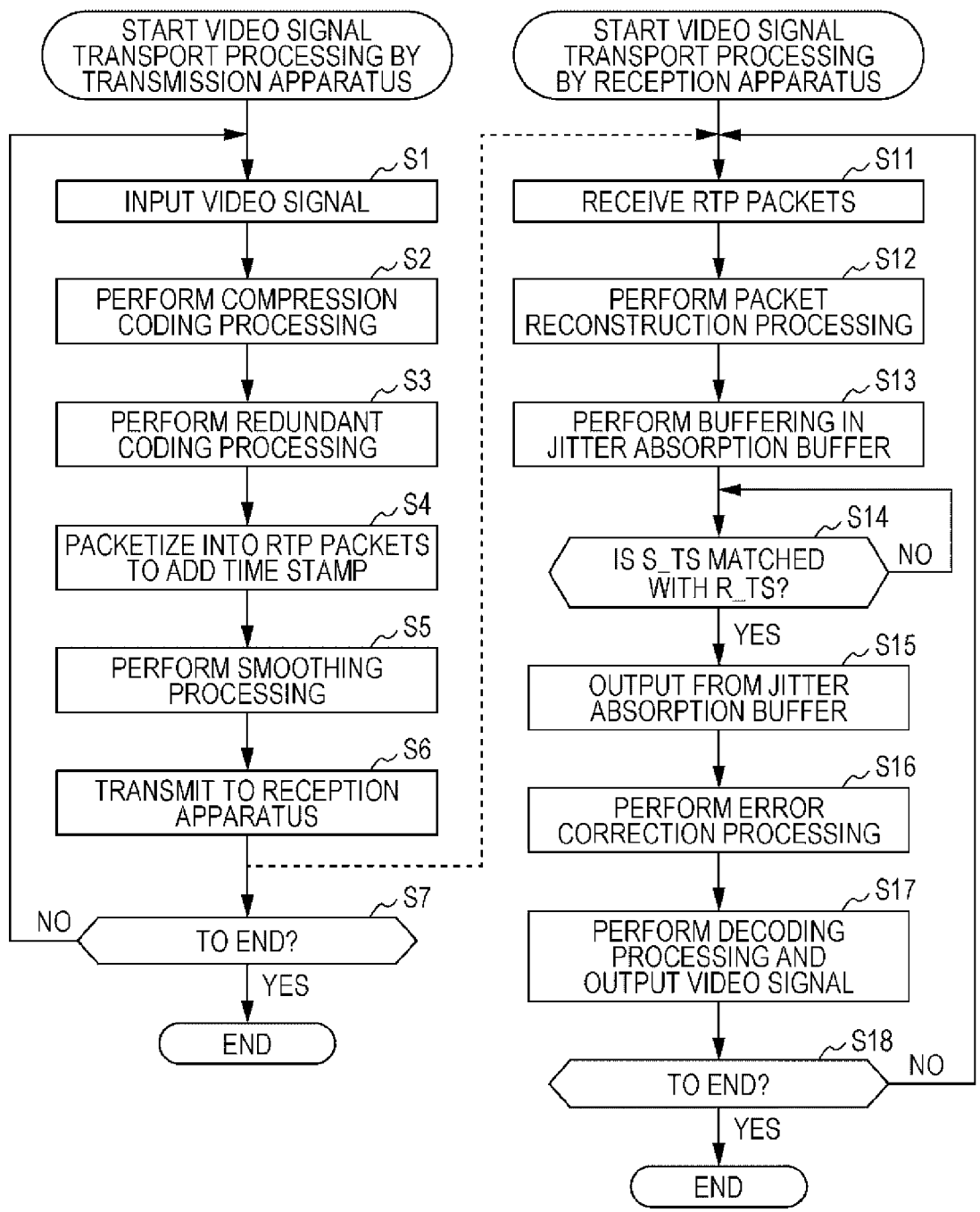
FIG. 3 is a flow chart for describing a video signal transport processing.

FIG. 3 is a flow chart for describing a video signal transport processing by the synchronous transport system 10.

As premises for this video signal transport processing, the reference signal advanced by the media phase correction amount M_OFFSET from the state of being synchronized with the reference signal of the reception apparatus 13 is supplied from the media phase control unit 28 of the reception apparatus 12 to the camera 11.

In step S1, the camera 11 performs the video shooting in synchronization with the reference signal supplied from the media phase control unit 28 and inputs the video signal obtained as the result via the HD-SDI I/F to the transmission apparatus 12. In step S2, the encoder 21 performs the compression coding on the video signal input from the camera 11 and outputs the coding data obtained as the result to the FEC processing unit 22. In step S3, the FEC processing unit 22 performs a redundant coding processing on the input coding data to add a forward error correction code to be output to the RTP processing unit 23.

In step S4, the RTP processing unit 23 packetizes the coding data added with the error correction code into RTP packets and adds the time stamp S_TS notified from the time stamp counter 48 to the respective RTP packets to be output to the smoothing unit 24. In step S5, the smoothing unit 24 smoothes RTP packets sequentially input from the RTP processing unit 23 to be output to the communication unit 25. In step S6, the communication unit 25 transmits the smoothed RTP packets to the reception apparatus 13 via the network 14. It should be noted that the processings in steps S1 to S6 are repeatedly executed until the video signal transport processing is ended.

On the other hand, in the reception apparatus 13, in step S11, the communication unit 41 receives the RTP packets storing the video signal the video signal subjected to the compression coding transmitted from the transmission apparatus 12 via the network 14 to be output to the RTP processing unit 42. In step S12, the RTP processing unit 42 reconstructs the RTP packets input from the communication unit 41 to be output to the jitter absorption buffer 43. In step S13, the jitter absorption buffer 43 buffers the reconstructed RTP packets.

In step S14, the jitter absorption buffer 43 determines whether or not the time stamp S_TS added to the buffered RTP packet is matched with the time stamp R_TS notified from the time stamp counter 48 and stands by until the determination result is affirmative.

It should be noted that in a case where an initial value of the count value TS output by the time stamp counter 30 of the transmission apparatus 12 is randomly set in conformity to IETF RFC3550, an offset value of the randomly set initial value of the count value TS and the system clock (that is, the count value of the time stamp count 48 of the reception apparatus 13) is notified from the RTCP processing unit 31 of the transmission apparatus 12 to the RTCP processing unit 50 of the reception apparatus 13 by using the RTCP packets, and the determination is made as to whether a value obtained by shifting the time stamp S_TS by this offset value is matched with the time stamp R_TS.

In step S14, in a case where the determination result is affirmative, the processing is progressed to step S15. In step S15, the jitter absorption buffer 43 outputs the RTP packet added with the time stamp S_TS that is matched with the time stamp R_TS to the FEC processing unit 44.

In step S16, the FEC processing unit 44 performs the error correction processing on the coding data stored in the RTP packet input from the jitter absorption buffer 43 to be output to the decoder 45. In step S17, the decoder 45 decodes the coding data and outputs the video signal obtained as the result to a subsequent stage while being synchronized with the reference signal generated by the reference signal generation unit 46. It should be noted that the processings in steps S11 to S17 are repeatedly executed until the video signal transport processing is ended. As stated above, the description on the video signal transport processing is ended.

Figure 4:
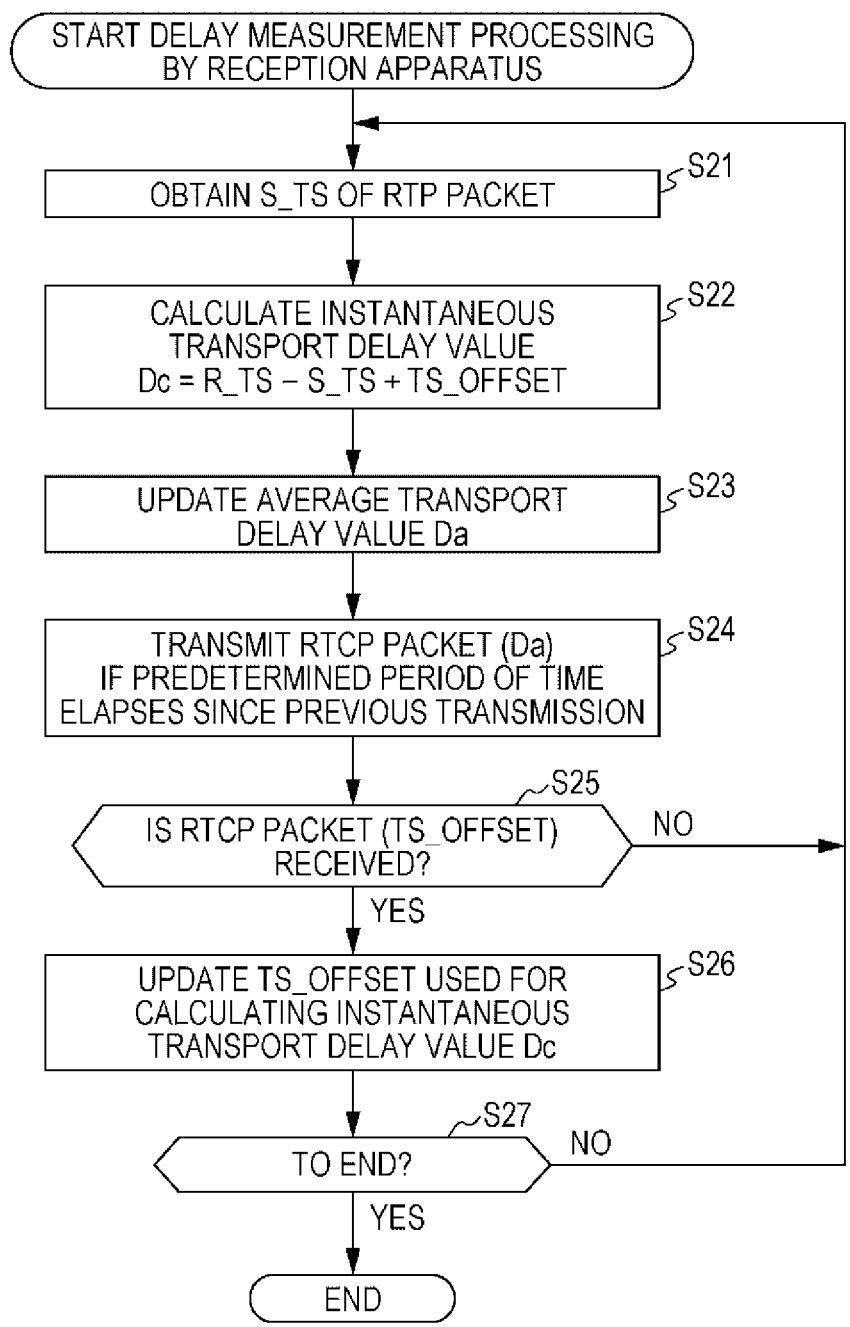
FIG. 4 is a flow chart for describing a delay measurement processing by a reception apparatus.

Next, FIG. 4 is a flow chart for describing a delay measurement processing by the reception apparatus 13 which is executed in parallel with the above-mentioned video signal transport processing.

In step S21, the delay measurement unit 49 of the reception apparatus 13 obtains the time stamp S_TS that is received by the communication unit 41 and added to the RTP packet input to the RTP processing unit 42 and also obtains the time stamp R_TS counted up by the time stamp counter 48. In step S22, the delay measurement unit 49 calculates the instantaneous transport delay value Dc of the RTP packet in the network 14 while following the subsequent expression (1).

$$\text{Instantaneous transport delay value } Dc = \text{Time stamp } R\_TS - \text{Time stamp } S\_TS + \text{Time stamp correction amount } TS\_OFFSET \quad (1)$$

It should be noted that in a case where the time stamp correction amount TS_OFFSET is not notified from the transmission apparatus 12 in the current stage, a predetermined initial value is adopted instead of the time stamp correction amount TS_OFFSET.

In step S23, the delay measurement unit 49 updates the average transport delay value Da on the basis of the calculated instantaneous transport delay value Dc to be output to the RTCP processing unit 50. In step S24, if a predetermined period of time elapses since the RTCP packet is transmitted in the previous time to the RTCP processing unit 31 of the transmission apparatus 12, the RTCP processing unit 50 stores the average transport delay value Da from the delay measurement unit 49 in the RTCP packet to be output to the communication unit 25 and to be transmitted to the RTCP processing unit 31 of the transmission apparatus 12. This average transport delay value Da is utilized as the transport delay information D_OFFSET in the transmission apparatus 12.

In step S25, the RTCP processing unit 50 determines whether or not the RTCP packet storing the time stamp correction amount TS_OFFSET transmitted from the RTCP processing unit 31 of the transmission apparatus 12 is received by the communication unit 41. In a case where this determination result is negative, the process is returned to step S21, and the subsequent processings are repeated.

In a case where the determination result in step S25 is affirmative, the process is progressed to step S26. In step S26, the RTCP processing unit 50 notifies the delay measurement unit 49 of the time stamp correction amount TS_OFFSET stored in the received RTCP packet. In response to this, the delay measurement unit 49 updates the time stamp correction amount TS_OFFSET used at a time when the processing in step S22 is executed thereafter to the notified time stamp correction amount. It should be noted that the processings in steps S21 to S26 are repeatedly executed until the above-mentioned video signal transport processing is ended. As stated above, the description on the delay measurement processing by the reception apparatus 13 is ended.

Figure 5:
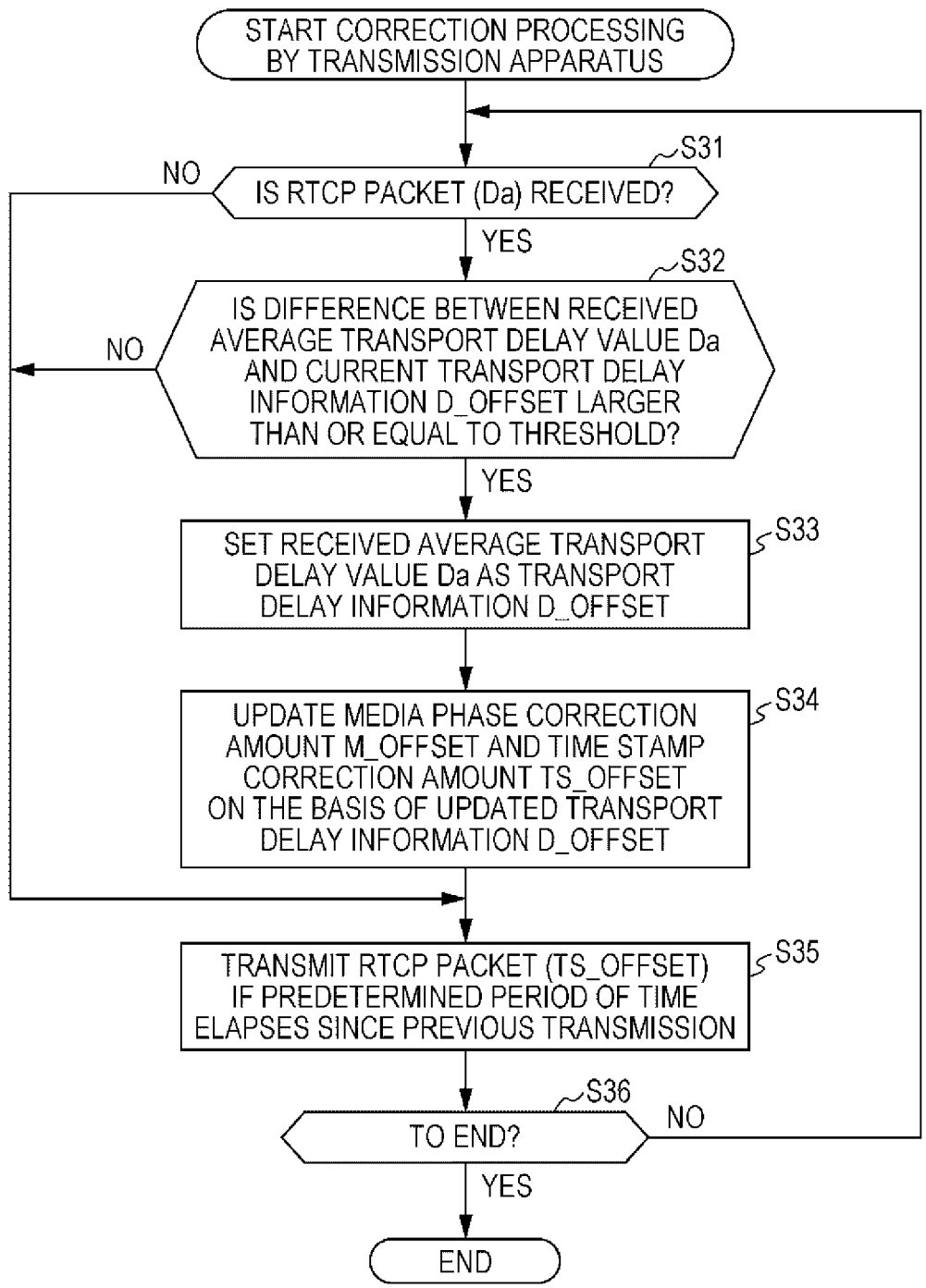
FIG. 5 is a flow chart for describing a correction processing by a transmission apparatus.

Next, FIG. 5 is a flow chart for describing a correction processing by the transmission apparatus 12 which is executed in parallel with the above-mentioned video signal transport processing.

In step S31, the RTCP processing unit 31 determines whether or not the RTCP packet transmitted by the RTCP processing unit 50 of the reception apparatus 13 as the process in step S24 described above is received by the communication unit 25. In a case where this determination result is affirmative, the process is progressed to step S32.

In step S32, the RTCP processing unit 31 compares the average transport delay value Da stored in the received RTCP packet with the current transport delay information D_OFFSET and determines whether or not a difference thereof is larger than or equal to a predetermined threshold. In a case where this determination result is affirmative, the process is progressed to step S33. In step S33, the RTCP processing unit 31 notifies the media phase control unit 28 and the time stamp control unit 29 of the average transport delay value Da as the new transport delay information D_OFFSET. After this, the process is progressed to step S34.

In step S34, the media phase control unit 28 uses the transport delay information D_OFFSET notified from the RTCP processing unit 31 to decide the media phase correction amount M_OFFSET while following the subsequent expression (2).

> Media phase correction amount $M\_OFFSET$=Transport delay information $D\_OFFSET$+Processing times of the respective units in the transmission apparatus 12 (known)+Processing times in a stage subsequent to the jitter absorption buffer 43 in the reception apparatus 13 (known) (2)

It should be noted however that the processing times of the respective units in the transmission apparatus 12 (known) and the processing times in the stage subsequent to the jitter absorption buffer 43 in the reception apparatus 13 (known) need to be previously measured and set in the media phase control unit 28.

Furthermore, the media phase control unit 28 gradually advances the phase of the reference signal input from the reference signal generation unit 27 up to the media phase correction amount M_OFFSET to be supplied to the camera 11. In this manner, by gradually adjusting the phase of the reference signal, it is possible to reduce the video interference or the like that may be generated in the video signal during a period in which the correction is carried out.

On the other hand, the time stamp control unit 29 uses the transport delay information D_OFFSET notified from the RTCP processing unit 31 to decide the time stamp correction amount TS_OFFSET while following the subsequent expression (3).

> Time stamp correction amount $TS\_OFFSET$=Transport delay information $D\_OFFSET \times$Time stamp frequency (3)

Furthermore, similarly as in the media phase control unit 28, the time stamp control unit 29 controls the time stamp counter 30 to gradually increase a value added to the time stamp TS representing the system clock based on the reference signal by the reference signal generation unit 27 up to the time stamp correction amount TS_OFFSET and notify the RTP processing unit 23 of the corrected time stamp S_TS. It should be noted however that the change in the value added to the time stamp TS is conducted in units of a line in a frame of the video signal, and the value added to the time stamp TS does not change in the same line.

In this manner, by gradually correcting the time stamp S_TS, it is possible to reduce the video interference or the like that may be generated in the video signal during a period in which the correction is carried out.

After this, the process is progressed to step S35. It should be noted that in a case where the determination result in step S31 is negative, steps S32 to S34 are skipped, and the process is progressed to step S35. Similarly, in a case where the determination result in step S32 is negative, steps S33 and S34 are skipped, and the process is progressed to step S35.

In step S35, if a predetermined period of time elapses since the RTCP packet storing the transport delay information D_OFFSET is transmitted in the previous time, the RTCP processing unit 31 generates the RTCP packet storing the latest transport delay information D_OFFSET to be transmitted from the communication unit 25 to the RTCP processing unit 50 of the reception apparatus 13.

The processings in steps S31 to S35 are repeatedly executed until the above-mentioned video signal transport processing is ended. As stated above, the description on the correction processing by the transmission apparatus 12 is ended.

According to the operation by the synchronous transport system 10 described above, by taking into account the transport delay in the network 14, the phase of the video signal transmitted from the transmission apparatus 12 and the time stamp are offset. According to this, it is possible to suppress the video interference at a time when the transported video signal is reproduced by the reception apparatus 13.

<Modified Examples>

Figure 6:
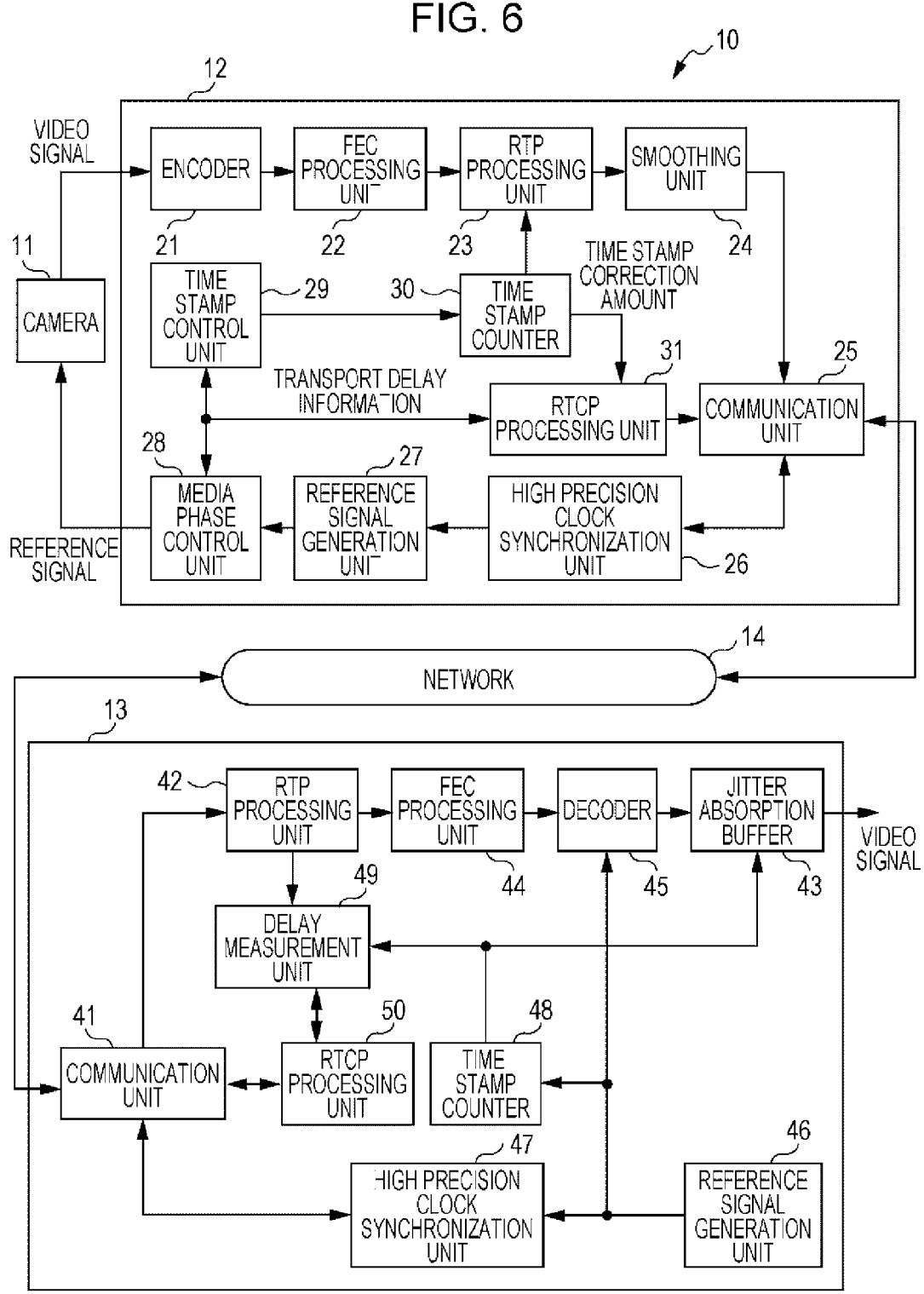
FIG. 6 is a block diagram illustrating another configuration example of the reception apparatus.

FIG. 6 illustrates another configuration example of the reception apparatus 13. The reception apparatus 13 illustrated in the same drawing is common with the reception apparatus 13 illustrated in FIG. 1 in terms of the component parts, and an arrangement of the jitter absorption buffer 43 is changed.

In this case, the time stamp control unit 29 of the transmission apparatus 12 is configured to decide the time stamp correction amount TS_OFFSET while following the subsequent expression (4).

> Time stamp correction amount $TS\_OFFSET$=(Transport delay information $D\_OFFSET$+Processing times of the respective units in the transmission apparatus 12 (known)+Processing times in a stage before the jitter absorption buffer 43 in the reception apparatus 13 (known))$\times$Time stamp frequency (4)

Also, the RTP processing unit 42 and the RTCP processing unit 50 perform measurements of a packet loss rate and a burst packet loss rate and notify the transmission apparatus 12 of these measurement results, and in accordance with the measurement results, the units of the redundant coding by the FEC processing unit 22 may be changed. According to this, a burst packet loss resistance can be applied to the network environment. It should be noted however that in this case, since the FEC processing time is changed, the known values in the expression (2) and the expression (4) need to be changed.

Furthermore, the RTP processing unit 42 and the RTCP processing unit 50 perform measurements of a network jitter, and in accordance with the measurement results, a data holding time in the jitter absorption buffer 43 may be changed to notify the transmission apparatus 12 of the change result. With this, a jitter resistance can be improved. It should be noted however that in this case, since the processing time in the jitter absorption buffer is changed, the known values in the expression (2) and the expression (4) need to be changed.

It should be noted that in addition to the video signal, the present disclosure can also be applied to a case in which multimedia data such as an audio signal is transported. Thus, the present invention can be used for audio only signals, video only signals, and signals including both audio and video.

Incidentally, a series of processings by the transmission apparatus 12 or the reception apparatus 13 described above can be executed by hardware and also be executed by software. In a case where a series of processings is executed by the software, a program constituting the software is installed into a computer. Herein, the computer includes a computer incorporated in dedicated-use hardware, a general-use computer, for example, that can execute various functions by installing various programs, and the like.

Figure 7:
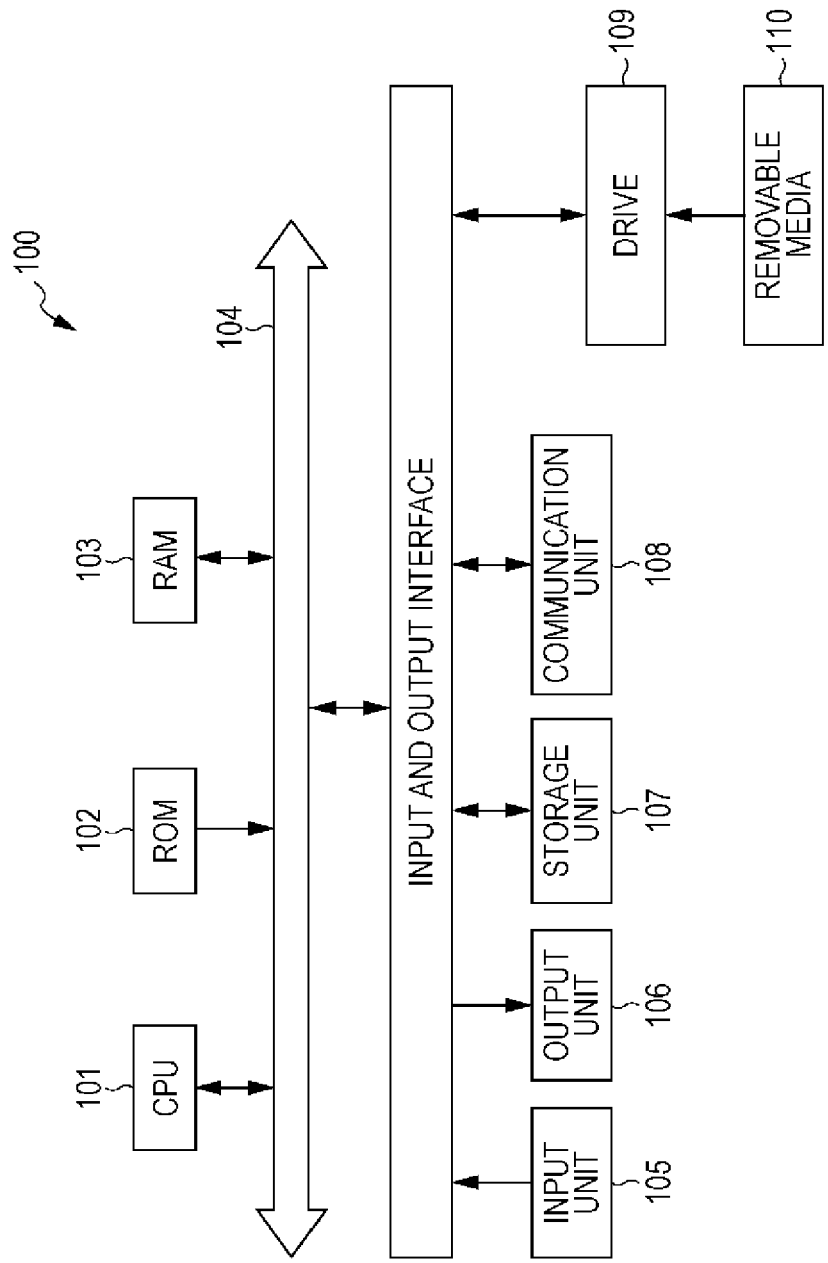
FIG. 7 is a block diagram illustrating a configuration example of a computer.

FIG. 7 is a block diagram illustrating a configuration of hardware of the computer that executes the above-mentioned series of processings by way of the program.

In a computer 100, a CPU (Central Processing Unit) 101, a ROM (Read Only Memory) 102, and a RAM (Random Access Memory) 103 are mutually connected by a bus 104.

An input and output interface 105 is further connected to the bus 104. An input unit 106, an output unit 107, a storage unit 108, a communication unit 109, and a drive 110 are connected to the input and output interface 105.

The input unit 106 is composed of a key board, a mouse, a microphone, and the like. The output unit 107 is composed of a display, a speaker, and the like. The storage unit 108 is composed of a hard disk, a non-volatile memory, and the like. The communication unit 109 is composed of a network interface and the like. The drive 110 drives removable media 111 such as a magnetic disc, an optical disc, an opto-magnetic disc, or a semiconductor memory.

In the computer 100 configured in the above-mentioned manner, the CPU 101 loads, for example, a program stored in the storage unit 108 onto the RAM 103 via the input and output interface 105 and the bus 104 for execution, so that the above-mentioned series of processings is carried out.

It should be noted that the program executed by the computer 100 may be a program in which the processings are carried out in a time-series manner in the order described in the present specification or may also be a program in which the processings are carried out in parallel or at a necessary timing, such as when a call is conducted.

It should be noted that the embodiments of the present disclosure are not limited to the above-mentioned embodiments, and various changes can be made in a scope without departing from the gist of the present disclosure.

(1) An apparatus including:
a receiver configured to receive a content signal;
a delay value receiver configured to receive a delay value from another apparatus;
a time stamp calculation unit configured to calculate a time stamp based on the delay value; and
a transmitter configured to send the content signal including the time stamp to the another apparatus.

(2) The apparatus according to (1), wherein the receiver is configured to receive the content signal which includes a video signal.

(3) The apparatus according to (2), wherein the receiver is configured to receive the content signal which includes an audio signal.

(4) The apparatus according to (1), wherein the receiver is configured to receive the content signal which includes an audio signal.

(5) The apparatus according to (1) to (4), further comprising:
a media phase correction calculation unit configured to calculate a media phase correction based on the delay value.

(6) The apparatus according to (5), wherein media phase correction calculation unit calculates the media phase correction based on the delay value and processing delay times in the apparatus.

(7) The apparatus according to (6), wherein the apparatus transmits the media phase correction to a camera which is providing the content signal to the receiver.

(8) An asynchronous packet transport network system for multimedia data including the apparatus according to (1) to (7).

(9) A method including:
receiving a content signal;
receiving a delay value from another apparatus;
calculating a time stamp based on the delay value; and
sending the content signal including the time stamp to the another apparatus.

(10) A non-transitory computer readable medium encoded with a program that, when loaded on a processor, causes the processor to perform a method including:
receiving a content signal;
receiving a delay value from another apparatus;
calculating a time stamp based on the delay value; and
sending the content signal including the time stamp to the another apparatus.

(11) An apparatus including:
a receiver configured to receive a content signal including a time stamp from another apparatus;
a delay value calculator configured to calculate a delay value based on the time stamp and a reception time of the time stamp; and
a transmitter configured to send the delay value to the another apparatus so that the another apparatus uses the delay value to calculate a later time stamp.

(12) The apparatus according to (11), wherein the receiver is configured to receive the content signal which includes a video signal.

(13) The apparatus according to (12), wherein the receiver is configured to receive the content signal which includes an audio signal.

(14) The apparatus according to (11), wherein the receiver is configured to receive the content signal which includes an audio signal.

(15) The apparatus according to (11) to (14), wherein the delay value calculator calculates the delay value based on the time stamp for a plurality of packets.

(16) The apparatus according to (11) to (15), wherein the delay value calculator calculates an average delay value based on the time stamp and a reception time of the time stamp for a plurality of packets, and the transmitter transmits the average delay value to the another apparatus.

(17) The apparatus according to (11) to (16), further comprising:
an output device configured to reproduce the content signal based on the time stamp.

(18) An asynchronous packet transport network system for multimedia data including the apparatus according to (11) to (17).

(19) A method including:
receiving a content signal including a time stamp from another apparatus;
calculating a delay value based on the time stamp and a reception time of the time stamp; and
sending the delay value to the another apparatus so that the another apparatus uses the delay value to calculate a later time stamp.

(20) A non-transitory computer readable medium encoded with a program that, when loaded on a processor, causes the processor to perform a method including:
receiving a content signal including a time stamp from another apparatus;
calculating a delay value based on the time stamp and a reception time of the time stamp; and
sending the delay value to the another apparatus so that the another apparatus uses the delay value to calculate a later time stamp.

REFERENCE SIGNS LIST

10 SYNCHRONOUS TRANSPORT SYSTEM
11 CAMERA
12 TRANSMISSION APPARATUS
13 RECEPTION APPARATUS
14 NETWORK
21 ENCODER
22 FEC PROCESSING UNIT
23 RTP PROCESSING UNIT
24 SMOOTHING UNIT
25 COMMUNICATION UNIT

26 HIGH PRECISION CLOCK SYNCHRONIZATION UNIT
27 REFERENCE SIGNAL GENERATION UNIT
28 MEDIA PHASE CONTROL UNIT
29 TIME STAMP CONTROL UNIT
30 TIME STAMP COUNTER
41 COMMUNICATION UNIT
42 RTP PROCESSING UNIT
43 JITTER ABSORPTION BUFFER
44 FEC PROCESSING UNIT
45 DECODER
46 REFERENCE SIGNAL GENERATION UNIT
47 HIGH PRECISION CLOCK SYNCHRONIZATION UNIT
48 TIME STAMP COUNTER
49 DELAY MEASUREMENT UNIT
50 RTCP PROCESSING UNIT

The invention claimed is:

1. An apparatus comprising:
a receiver configured to receive a content signal;
a delay value receiver configured to receive a delay value from another apparatus;
a time stamp calculation unit configured to calculate a time stamp based on the delay value;
a transmitter configured to send the content signal including the time stamp to the another apparatus; and
a media phase correction calculation unit configured to calculate a media phase correction amount based on the delay value, wherein a reference signal, advanced by the media phase correction amount from a state of being synchronized with a reference signal of the another apparatus, is supplied to a camera providing the content signal to the receiver.

2. The apparatus according to claim 1,
wherein the receiver is configured to receive the content signal which includes a video signal.

3. The apparatus according to claim 2,
wherein the receiver is configured to receive the content signal which includes an audio signal.

4. The apparatus according to claim 1,
wherein the receiver is configured to receive the content signal which includes an audio signal.

5. The apparatus according to claim 1,
wherein media phase correction calculation unit calculates the media phase correction based on the delay value and processing delay times in the apparatus.

6. An asynchronous packet transport network system for multimedia data including the apparatus according to claim 1.

7. A method comprising:
receiving a content signal;
receiving a delay value from another apparatus;
calculating a time stamp based on the delay value;
sending the content signal including the time stamp to the another apparatus;
calculating a media phase correction amount based on the delay value; and
supplying, a reference signal advanced by the media phase correction amount from a state of being synchronized with a reference signal of the another apparatus, to a camera which is providing the content signal.

8. A non-transitory computer readable medium encoded with a program that, when executed by a processor, causes the processor to perform a method comprising:
receiving a content signal;
receiving a delay value from an apparatus;
calculating a time stamp based on the delay value; and
sending the content signal including the time stamp to the apparatus;
calculating a media phase correction amount based on the delay value; and
supplying, a reference signal advanced by the media phase correction amount from a state of being synchronized with a reference signal of another apparatus, to a camera which is providing the content signal.

9. An apparatus comprising:
a receiver configured to receive a content signal including a time stamp from another apparatus;
a delay value calculator configured to calculate a delay value based on the time stamp, a time stamp correction amount, and a reception time of the time stamp; and
a transmitter configured to send the delay value to the another apparatus so that the another apparatus uses the delay value to:
calculate a later time stamp, and
calculate a media phase correction amount, wherein the media phase correction amount is used to advance a reference signal in the another apparatus from a state of being synchronized with a reference signal of the apparatus.

10. The apparatus according to claim 9,
wherein the receiver is configured to receive the content signal which includes a video signal.

11. The apparatus according to claim 10,
wherein the receiver is configured to receive the content signal which includes an audio signal.

12. The apparatus according to claim 9,
wherein the receiver is configured to receive the content signal which includes an audio signal.

13. The apparatus according to claim 9,
wherein the delay value calculator calculates the delay value based on the time stamp for a plurality of packets.

14. The apparatus according to claim 9,
wherein the delay value calculator calculates an average delay value based on the time stamp and a reception time of the time stamp for a plurality of packets, and the transmitter transmits the average delay value to the another apparatus.

15. The apparatus according to claim 9, further comprising:
an output device configured to reproduce the content signal based on the time stamp.

16. An asynchronous packet transport network system for multimedia data including the apparatus according to claim 9.

17. A method comprising:
receiving a content signal including a time stamp from an apparatus;
calculating a delay value based on the time stamp, a time stamp correction amount, and a reception time of the time stamp;
sending the delay value to the apparatus;
by the apparatus using the delay value
calculating a later time stamp; and
calculating a media phase correction amount, wherein the media phase correction amount is used to advance a reference signal in the apparatus from a state of being synchronized with a reference signal of another apparatus.

18. A non-transitory computer readable medium encoded with a program that, when executed by a processor, causes the processor to perform a method comprising:
receiving a content signal including a time stamp from an apparatus;

calculating a delay value based on the time stamp, a time stamp correction amount, and a reception time of the time stamp; and sending the delay value to the apparatus so that the apparatus uses the delay value to:
- calculate a later time stamp, and
- calculate a media phase correction amount, wherein the media phase correction amount is used to advance a reference signal in the apparatus from a state of being synchronized with a reference signal of another apparatus.

* * * * *